United States Patent [19]
Welch

[11] 3,937,534
[45] Feb. 10, 1976

[54] THRUST BEARING RESONANCE CHANGER

[75] Inventor: William P. Welch, Sunnyvale, Calif.

[73] Assignee: Westinghouse Electric Corporation, Pittsburgh, Pa.

[22] Filed: Apr. 9, 1975

[21] Appl. No.: 566,480

[52] U.S. Cl.................... 308/135; 308/168
[51] Int. Cl.² ............ F16C 17/04; F16C 17/10; F16C 19/04; F16C 1/24
[58] Field of Search.............. 308/135, 154, 168

[56] References Cited
UNITED STATES PATENTS

| | | | |
|---|---|---|---|
| 2,168,345 | 8/1939 | Kingsbury | 308/168 |
| 2,691,556 | 10/1954 | Lakey | 308/168 |
| 3,199,173 | 8/1965 | Lefevre | 308/135 |

*Primary Examiner*—Lloyd L. King
*Attorney, Agent, or Firm*—F. J. Baehr, Jr.

[57] ABSTRACT

A plurality of semi-circular flat springs are sequentially disposed between shoes and a base plate of a tilting shoe type thrust bearing to reduce the axial resonant frequency of a propulsion system.

9 Claims, 4 Drawing Figures

THRUST BEARING RESONANCE CHANGER

BACKGROUND OF THE INVENTION

This invention relates to thrust bearings and more particularly to tilting shoe type thrust bearings having a low resonant frequency when subjected to periodical axial loading.

Frequently, propeller shafts of new ships are subjected to serious longitudinal or axial vibration as inadvertently the critical speed of the shaft is such that the longitudinal vibration occurs near the full power operating speed of the shaft.

Hydraulic resonant chambers have been utilized to lower the overall stiffness of the thrust bearings by a factor of 4 or 5, thus dropping the longitudinal critical speed about 50 percent and lowering the critical speed to a value not frequently used and to one at which the load, stresses and propeller excitation values are greatly reduced. While hydraulic resonance changers are effective to reduce the longitudinal stiffness of the thrust bearing, they have experienced operational problems due to galling of the pistons and cylinders resulting in the cylinders and piston rods sticking or freezing. Hydraulic resonance changers are also expensive and require complex hydraulic circuitry to automatically equilibrate the propeller thrust.

SUMMARY OF THE INVENTION

A tilting shoe type thrust bearing having a plurality of tilting shoes disposed in a circular array wherein each shoe has a load bearing button-shape portion, when made in accordance with this invention, incorporates the following improvements which comprise a plurality of arcuate spring segments disposed to provide axial support for the shoes, at least one of the arcuate spring segments having a plurality of surfaces cooperatively associated and aligned with the load bearing button shaped surfaces on the shoes, and a plurality of spacers or integral lugs disposed between adjacent arcuate spring segments. The spacers between one set of spring segments are intermediately disposed with respect to the button shaped portions and the spacers between another set of arcuate spring segments are disposed in alignment with the button shaped portions thereby equally distributing the load over the array of shoes, reducing the stiffness of the thrust support structure of the bearing and thus reducing the frequency at which the bearing will resonate, when subjected to periodic axial forces during operation.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
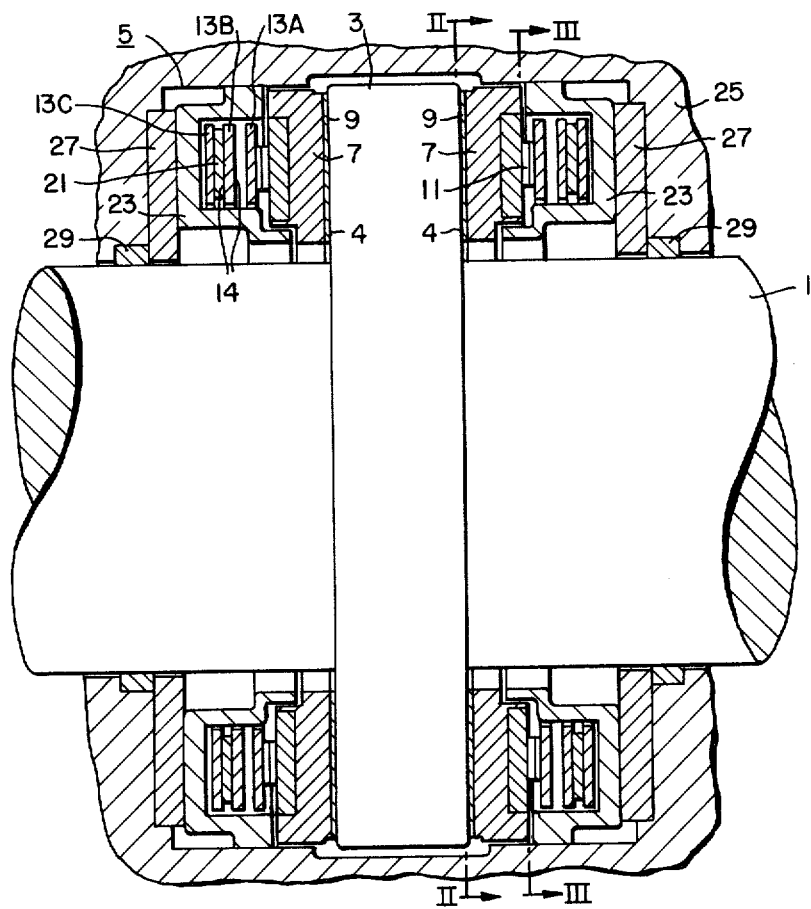
FIG. 1 is a partial sectional view of a Kingsbury or other type of tilting shoe thrust bearing made in accordance with this invention.
Figure 2:
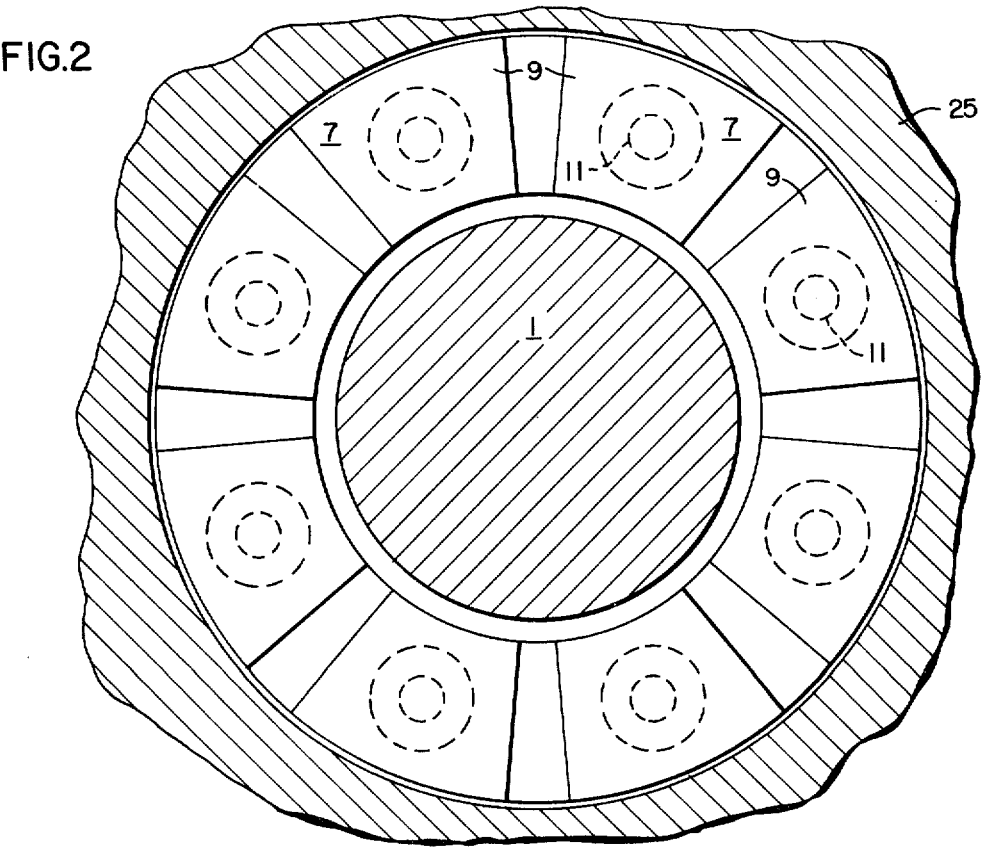
FIG. 2 is a partial sectional view taken on line II—II of FIG. 1.

Referring now to the drawings in detail, and in particular to FIG. 1 and 2, there is shown a shaft 1 having a thrust collar 3 extending radially therefrom to form a pair of generally parallel annular planar bearing surfaces 4.

A double acting Kingsbury or other type of tilting shoe thrust bearing 5 having a plurality of spherically mounted tilting shoes 7 which are disposed in a circular array so as to engage the planar bearing surfaces 4 of the thrust collar 3.

The shoes or pads 7 have a planar face 9 formed from a suitable bearing material such as babbitt and a hardened insert forming a spherical shaped boss or button 11 on the side opposite the planar face 9.

Figure 3:
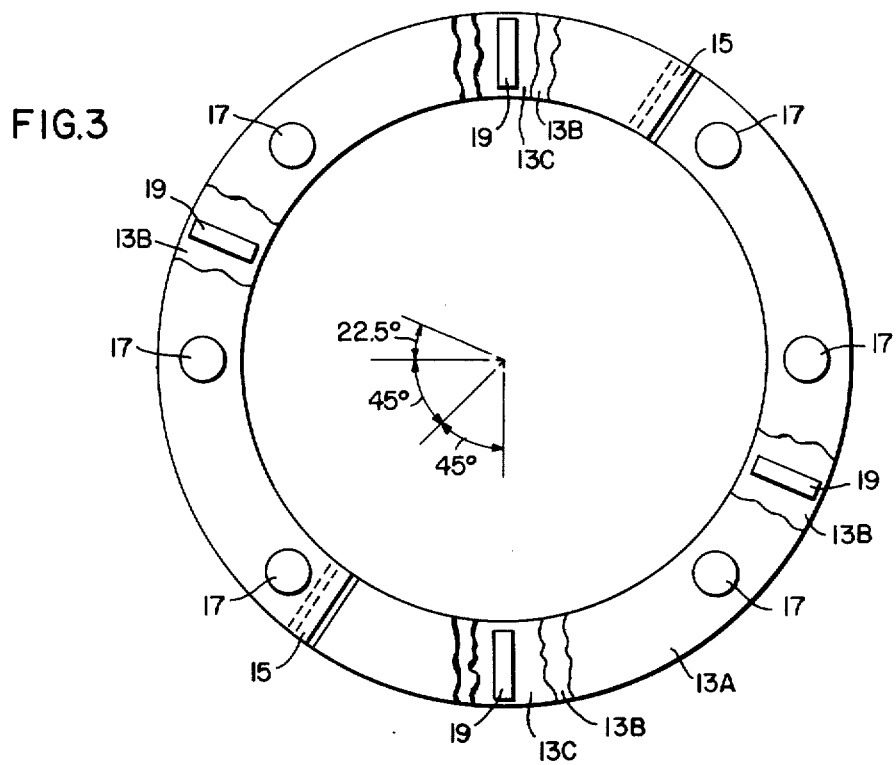
FIG. 3 is a partial sectional view taken on line III—III of FIG. 1.
Figure 4:
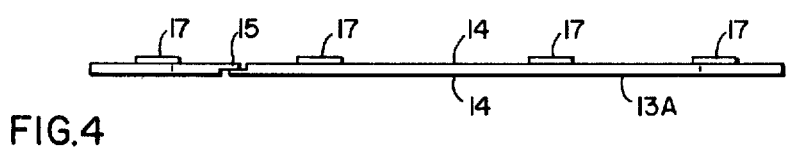
FIG. 4 is an elevational view of a pair of arcuate spring members forming a ring.

A plurality of arcuate spring members 13A, B and C are sequentially disposed adjacent the array of tilting shoes 7. As shown best in FIGS. 3 and 4, each spring member 13 comprises two semi-circular spring segments having two generally parallel planar surfaces 14. The ends of each segment have a step or connecting means 15 which cooperates with the end of the mating segment to form a continuous annular ring. The connecting means 15 are necessary to allow assembly of the spring members 13 over the body of the shaft 1, which is usually provided with integral flanged couplings at each end.

The arcuate spring member 13A has a plurality of bosses, buttons or other surfaces 17, which are cooperatively associated with the spherical shaped bosses 11 on the shoes 7 to provide pivotal or tilting movement of the shoes, in conformity with the known principles of the movement of said shoes due to the formation of a wedge shaped oil film developing between the babbitted surface 9 of the shoe 7 and the planar bearing surface 4 of the collar 3 when the bearing is operated with a proper supply of oil.

Spacers or lugs 19 are disposed between the adjacent spring members 13. The number of spacers 19 between adjacent rings being equal to the number of shoes 7. The spacers 19 between one set of adjacent rings 13A and 13B being intermediately disposed with respect to the bosses 11 or 17 and spacers 19 between the other set of adjacent rings 13 being disposed in alignment with the bosses 11 or 17. A base ring 23 having a U-shaped cross-section formed in half segments is disposed to encircle the spring members 13 and spacers 19. Spacers 19 are also disposed between the arcuate spring member 13C and the base ring 23. These spacers 19 are also intermediately disposed with respect to the bosses 11 and 17.

The spacers 19 are preferably fastened or attached to or are integral with one of the arcuate members so that their position generally remains fixed with respect to the bosses 11 or 17.

The steps or connecting means 15 are disposed midway between spacers 19 or spaces 19 and bosses 11 and 17 for when so disposed the bending moment at the connecting means 15 is zero.

The base ring 23 is disposed in a housing 25, which is rigidly mounted to resist thrust appled by the shaft through the thrust bearing.

A filler piece 27 of the desired thickness is disposed between the housing 25 and the base ring 23 to adjust the end play within the bearing.

An oil seal 29 such as a bronze or elastomer ring or other type of sealing means is disposed adjacent the shaft to retain oil within the housing during operation.

The disposition of the bosses 11 and 17, the spacers 19, and the location and disposition of the connection between segments 15 cooperate to automatically equilize the pressure between the shoes 7 and the planar surface 4 on the collars 3 in order to compensate for variations in the shoes 7 and their disposition and to also substantially reduce the longitudinal or axial stiffness of the thrust bearing, thereby lowering its critical speed or resonant frequency so that the critical speed of the bearing will be well below the normal operating speed and occur within a speed range in which the loads, stresses and propeller exertion values are greatly reduced. Thus, a resonant changer is provided which can be easily adapted to various operating conditions and is economical to produce and maintain.

What is claimed is:

1. A tilting shoe type thrust bearing having a plurality of tiling shoes disposed in a circular array, each shoe having a load bearing portion, the improvement comprising a plurality of arcuate spring segments disposed to form an annular ring which provides axial support for said shoes, said annular ring having a plurality of surfaces cooperatively associated and aligned with said load bearing surfaces on the shoes, a plurality of spacers disposed adjacent said annular ring, said spacers being intermediately disposed with respect to said load bearing surfaces, and on the side opposite thereof thereby equally distributing the load over the array of shoes and reducing the stiffness of said bearing and thus reducing the frequency at which the bearing will resonate when subjected to periodic axial forces during operation.

2. A tilting shoe type thrust bearing as set forth in claim 1, wherein the arcuate spring members are semicircular whereby two arcuate spring members cooperate to form a complete annular ring.

3. A tilting shoe type thrust bearing as set forth in claim 2, wherein the ends of the semi-circular arcuate spring segments have interlocking means cooperatively associated to support the thrust load as it is applied thereto.

4. A tilting shoe type thrust bearing as set forth in claim 2, wherein a plurality of complete annular rings are sequentially disposed with spacers between adjacent rings.

5. A tilting shoe type thrust bearing as set forth in claim 2 and further comprising a base ring disposed so as to be generally continuously supported to accept thrust loading applied thereto.

6. A tilting shoe type thrust bearing as set forth in claim 5 and further comprising a plurality of spacers disposed between said base ring and the adjacent annular ring.

7. A tilting shoe type thrust bearing as set forth in claim 6, wherein there are three annular rings sequentially disposed between the shoes and the base ring.

8. A tilting shoe type thrust bearing as set forth in claim 7, wherein the number of spacers between any two adjacent portions is equal in number to the number of shoes.

9. A tilting shoe type thrust bearing as set forth in claim 4 wherein spacers are disposed between adjacent annular rings, said spacers between one pair of annular rings being intermediately disposed with respect to said load bearing surfaces and said spacers between another pair of annular rings being disposed in alignment with said load bearing surfaces.

* * * * *